Aug. 27, 1946.    J. K. NORTHROP    2,406,506
ALL-WING AIRPLANE
Filed Feb. 21, 1944    4 Sheets-Sheet 1
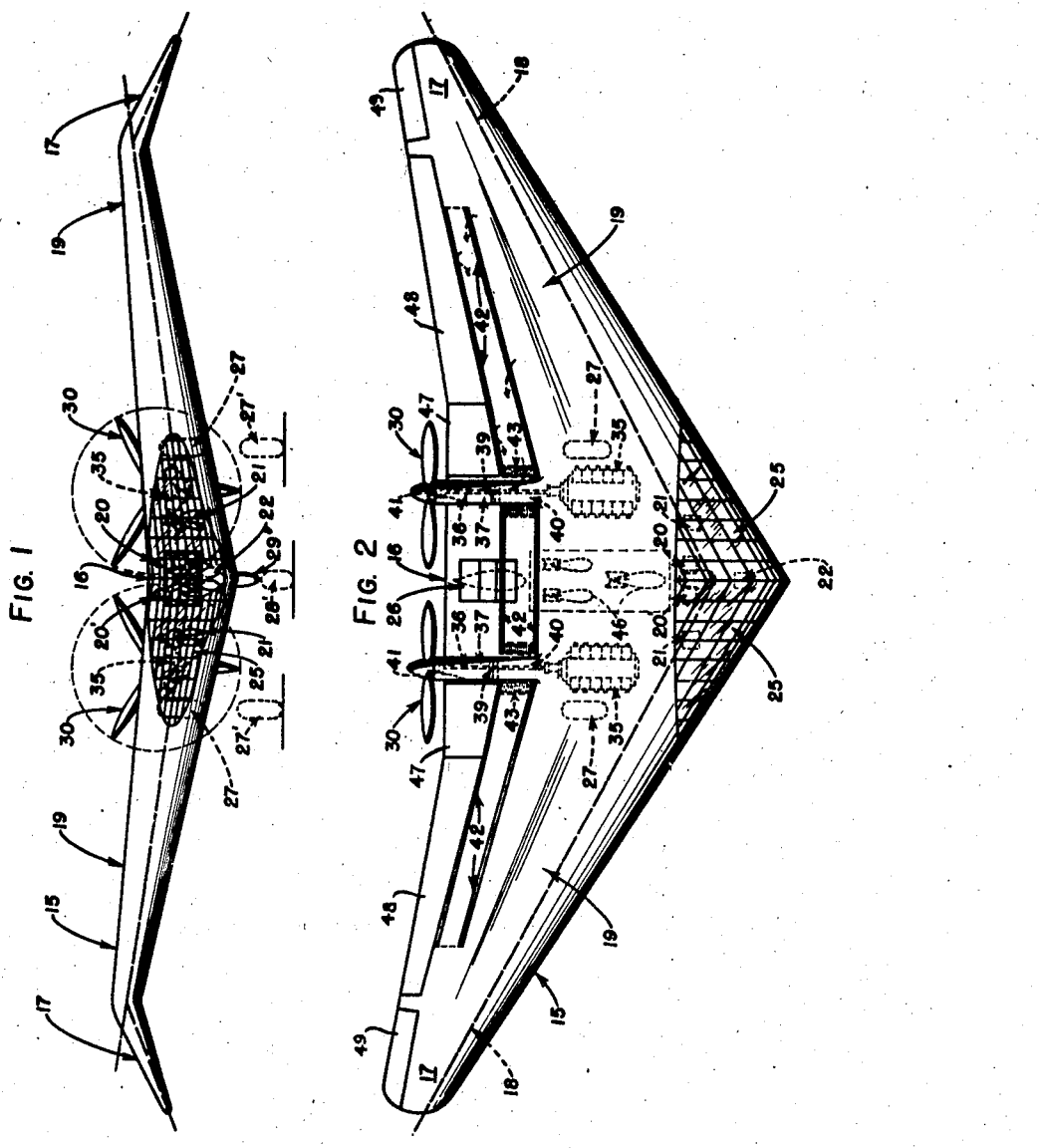
JOHN K. NORTHROP
INVENTOR.
BY *Lippincott & Metcalf*
ATTORNEYS.

Aug. 27, 1946.   J. K. NORTHROP   2,406,506
ALL-WING AIRPLANE
Filed Feb. 21, 1944   4 Sheets-Sheet 2

JOHN K. NORTHROP
INVENTOR.

BY *Lippincott & Metcalf*

ATTORNEYS.

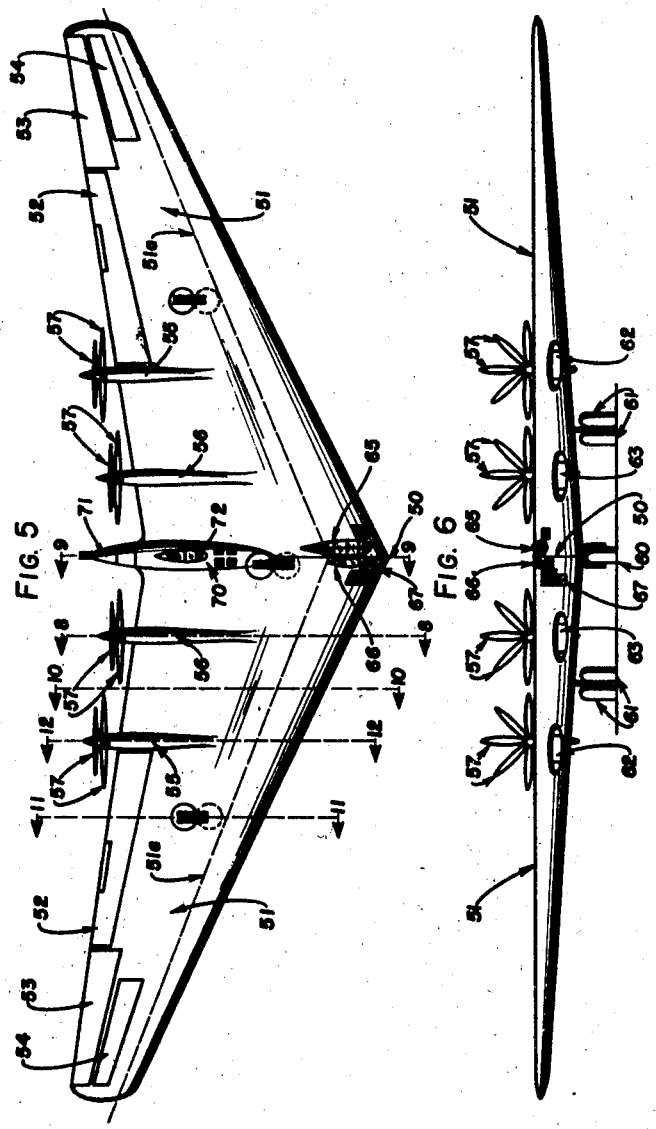

Aug. 27, 1946.　　　J. K. NORTHROP　　　2,406,506
ALL-WING AIRPLANE
Filed Feb. 21, 1944　　　4 Sheets-Sheet 4

JOHN K. NORTHROP
INVENTOR.

BY *Lippincott + Metcalf*

ATTORNEYS

Patented Aug. 27, 1946

2,406,506

UNITED STATES PATENT OFFICE 2,406,506

ALL-WING AIRPLANE

John K. Northrop, Los Angeles, Calif., assignor to Northrop Aircraft, Inc., Hawthorne, Calif., a corporation of California Application February 21, 1944, Serial No. 523,311

20 Claims. (Cl. 244—13)

This invention relates to aircraft, and particularly to aircraft of the "all-wing," tailless type. The present application is a continuation-in-part of my copending application, entitled "All-wing airplane," filed January 10, 1940, Serial No. 339,644.

The broad purpose of the invention is to provide an airplane having superior flying qualities, and to this end the objects of the invention are:

To provide an airplane of moderate span having a habitable wing wherein not only the crew and payload but also all of the essential mechanism with the exception of the actual airscrew and the extended portions of the landing gear may be comprised or housed; to provide an airplane of exceptionally high lift to drag ratio; to provide an airplane of the character described which is both stable about all of the three principal axes in normal flight and, at the same time, controllable to the same or even greater degree than the conventional type of plane; to provide an airplane of extreme lightness with respect to its carrying capacity, giving a large payload for a given weight and power; to provide an airplane having small radii of gyration around its principal axes, so that it may be stabilized and controlled by the application of relatively small moments and correspondingly small stresses; to provide an airplane wherein parasitic drag is reduced to a minimum, so as to give high speed in comparison with the power applied; to provide an airplane wherein aerodynamic interference between the basic parts of the structure is reduced to a minimum or is favorable in sign, i. e. so that any interference which exists increases rather than decreases the ratio of lift to drag; to provide an airplane wherein the wing has sufficient thickness for habitability and may be flown at relatively large angles of attack without separation of the air stream, or stalling; and to provide an airplane wherein the high lift or anti-stalling flows are supplied with maximum efficiency and without sacrifice of other advantages.

Other objects of my invention will be apparent or will be specifically pointed out in the description forming a part of this specification, but I do not limit myself to the embodiments of the invention herein described, as various forms may be adopted within the scope of the claims.

The idea of the all-wing or habitable wing airplane is not new, but has occupied the attention of aeronautical engineers for nearly thirty years, since the early United States Patent No. 1,114,364 to Junkers, filed January 26, 1911, and dated October 20, 1914. The theoretical advantages of such a construction are obvious. The entire structure can be utilized to supply lift, and since there is no fuselage (which contributes nothing to this factor but which does add to the weight), the saving in weight can be devoted to payload. The eliminated structures contribute in a large degree to drag, not only that due directly to their aerodynamic forms, but also an additional drag due to interference between the airflows caused by them and those due to the sustaining airfoils themselves. A reduction in parasitic drag (i. e., drag which contributes nothing to the lift) assures either that greatly increased speed may be obtained from the same power, or that the same speed may be attained with less power.

All of the above-mentioned advantages have been apparent for years, and have been highly publicized. What has not been so apparent have been the accompanying problems necessary to be overcome before these advantages can be realized. Not the least of these has involved the question of size. Gasparri, writing in 1932, published designs of a habitable wing plane, with tail surfaces mounted on spars, with the statement that the minimum span at which such planes would become practical would be about forty-five meters, or one hundred forty-eight feet, while other estimates have greatly exceeded this figure. Other attacks at the same problem have attempted to eliminate the tail surface but have retained a fuselage or nacelle, as in the designs of Lippisch, Hill, Lachmann, Fauvel and others. Neither of these solutions really meets the problem, since the parasitic resistances, although reduced, are not eliminated.

Even more serious, however, is the question of stability. In order that it may be flown satisfactorily an airplane must be stable, both statically and dynamically, about its three major axes of roll, pitch and yaw, i. e. if its attitude of normal flight be disturbed with respect to any of these axes, moments should thereby be set up which tend to return it to normal attitude (static stability) and these moments should not tend to set up oscillations about the axes of reference or, more properly, the oscillations which inevitably will be set up should be damped as highly as possible (dynamic stability).

In the conventional airplane stability about the longitudinal or roll axis is usually accomplished by giving the wing a positive dihedral angle, that is, canting each half of the wing slightly upward so that if a roll starts a resulting side slip will increase the lift on the drooping wing and decrease the lift on the rising one and thus supply a correcting moment. Stability about the pitch axis is conventionally attained by the horizontal tail surfaces which are usually set at a smaller (or even negative) aerodynamic angle of attack than the wing and act through the long lever arm of the fuselage to hold the wing at the proper angle of attack. If the plane tends to nose up, the lift on the tail becomes more positive, and vice versa, and the plane is thus restored to normal attitude. Stability in yaw is supplied by the vertical tail surfaces, which also act through the long lever arm to supply a lift in the proper direction to correct any deviation from straight horizontal flight.

In a tailless plane the same expedient may be used to give stability in roll as in the normal plane, but the absence of fuselage and tail eliminates the possibility of the conventional modes of stabilization about the other two axes.

Two solutions have been suggested, and to some extent, used to achieve stability in pitch. The first is the use of inherently stable airfoil sections for the wings. Such sections have a double or S-shaped camber, upwardly convex on the leading edge and upwardly concave on the trailing edge, which supply moments about the pitch axis of the same general character as those supplied by the conventional separate wing and stabilizer structure. Such wings are, however, both structurally and aerodynamically poor. The other solution involves the use of conventional airfoil sections, but provides the wings with sweepback and washout, i. e. the two halves of the wing are set at an angle, like a shallow V flown point forward, and the wing is twisted from root to tip so that the aerodynamic angle of attack is greatest at the root of the wing and least at the tip. Thus, if the wing be flown at an angle of attack such that it shows an overall lift of zero, the central portion or root of the wing will have a positive angle of attack while the tip portion has a negative angle of attack, and since the tips are swept back behind the centers of lift and gravity, when the plane noses down the result is a moment which tends to increase the angle of attack of the wing as a whole, and again the necessary stabilizing moments are achieved.

Stability in yaw can be obtained in all-wing planes by means of fins or end plates on the ends of the wings, particularly if these end plates be "toed-in" slightly. Without the toe-in the stabilizing effect of the end plate is proportional to the square of the angle of yaw, and the restoring moment is consequently extremely small for small angles which condition tends to make the plane dynamically unstable. Ample stability is supplied by toe-in, but this increases drag materially, since the toed-in plates have rearwardly directed components of both lift and drag which may be so great as to make supposed elimination of parasitic drag illusory.

A better method, as provided by the present invention in one of its aspects, is to construct the wing tips with a negative dihedral angle. As will be more fully described later herein, the effect of the downward deflection of the wing tips is to set up a pair of outwardly directed forces which provide a couple proportional to the angle of yaw and give a wing of great stability around this axis. Furthermore, this arrangement of the wing tips does not introduce any appreciable drag, as do the more conventional end plates, while it does contribute additional lift and an effective increase in aspect ratio. In some cases, adequate stability in yaw may be achieved merely by use of sweepback.

Damping and resulting dynamic stability about all axes is provided by the same forces as in conventioned designs, although there is a general tendency toward high oscillation frequencies which must be taken into account in computing the distribution of loading and moments.

With solutions known to all of the factors involving stability in flight, it might appear that it is merely required that they be combined in order to produce a commercial airplane of the all-wing type and thus achieve the above-mentioned theoretical advantages. There are, however, factors involved which are not so obvious, and insofar as I am aware, no successful combination has heretofore been achieved.

One problem encountered in tailless airplane design is excessive landing speed. The wings of tailless airplanes suffer a material loss of lift when the elevators along their trailing edges are raised for landing, meaning an enforced relatively high landing speed, and the problem of counteracting this loss of lift in landing has continued as a problem without satisfactory solution. In order to achieve a moderate landing speed, it has heretofore been necessary to substantially double the wing area that would otherwise be required. This means that approximately double the drag of the more highly loaded wing will be suffered, and thus we reach the conclusion that we must throw away all of the gain which has been obtained by the all-wing type of structure, and this has proved to be substantially the case in the all-wing structures heretofore built.

Furthermore, in accordance with current theories, the various expedients which have been discussed for providing stability about the various axes have been considered wholly or partially incompatible, so that it has been believed impossible so to combine them in a satisfactory airplane. As illustrative of this, in order to be reasonably efficient a wing must have a reasonably high aspect ratio, that is, the ratio of its span to its mean chord should be greater than four or five. In order to provide a habitable wing, however, the chord at the wing root should be large, and therefore, if the aspect ratio is to be favorable, the wing must either be tapered or the span must be excessive. The most recent general survey of all-wing theory (Wuester, Jahrbuch der Deutsch. Luftfahrforsehung, 1937), stated dogmatically that the degree of taper of the wing fixes the extent to which sweepback and washout can be used to provide stability, and that while any practical plane having a substantially rectangular wing need rely on the use of autostable profiles for only approximately one-half of its stability, the use of trapezoidal planform (i. e. taper ratios of the order of 1:3) requires that 70% of the stability be inherent in the section and that with triangular planforms the sections used must be 100% auto-stable. The center of lift of the most advantageous profiles is approximately one-quarter chord distance back from the leading edge of the wing, and a triangular wing flown apex forward therefore has considerable inherent sweepback. It will be seen, therefore, that this theory indicates sweepback to be ineffective with highly tapered wings.

As it has already been shown that inherently stable sections have poor lift-drag ratios, this would indicate that in an all-wing plane an attempt to improve these ratios would be futile, since relatively high drag would be introduced either through a low aspect ratio, giving a high induced drag, or, if the aspect ratio were improved by taper, that a wing having inherently high drag would have to be used. Furthermore, it has been believed that with high tapers the low Reynolds number effective at the tips of the wings would be certain to make them subject to tip-stall.

The designer is also confronted by the fact that the most efficient sections have a thickness of approximately 12% of the chord length; this thickness ratio may be carried up to approximately 25% without reducing the aerodynamic efficiency unduly, but it cannot be carried much above this point because of the difficulty of maintaining the airflow over the upper surface of the wing at the higher angles of attack, causing a tendency to stall. This again dictates wings having long root chords, not only to produce a reasonably great floor area in the habitable portion of the wing, but also in order to produce sufficient head room within this area.

It thus becomes apparent why the "flying wing" has not become commercially useful in spite of its attractiveness. Various investigators have produced aircraft of this type which have flown and have shown more or less satisfactory control characteristics, but all have used such low wing loading in order to obtain reasonable landing speed that they have sacrificed a large part of the advantages in speed and power that they hoped to gain. The application of the known high-lift devices has not been possible in these planes, since the lever arms available in their control surfaces have not been large enough to overcome the pitching moments produced by conventional flaps, while slots have been rejected because of their drag at low angles of attack, icing difficulties, etc.

As a result of the factors above discussed, although various studies have been made and tentative designs produced looking to the solution of the problem, the various incompatibilities mentioned have appeared too deep-seated for compromise and no design of practical value has emerged. The present invention is basically concerned with the reconciliation of the above-mentioned incompatibilities, actual or supposed. Various of the elements involved are those which have been discussed, others are believed to be new in themselves, but the actual invention resides primarily in the combination of design elements and disposition of the parts, old or new, which leads to a type of airplane which is not merely comparable with planes of currently accepted types from the points of view of the ratios of speed to power, power to payload, and initial and maintenance costs to load carrying capacity, but actually greatly excels in these features and at the same time has a reasonable landing speed and is satisfactory from the general operating point of view.

The nature of the invention will best be appreciated by reference to the detailed description which follows of certain typical illustrative embodiments illustrated in the drawings, wherein:

Fig. 1 is a front elevation of a "medium bomber" embodying my invention shown in flight attitude, the position of the extended landing gear being illustrated by the dotted lines;

Fig. 2 is a plan view of the same airplane;

Fig. 5 is a plan view of the airplane of Fig. 4;

Fig. 6 is a front elevational view of the airplane of Fig. 4;

Figs. 8, 9, 10, 11 and 12 are diagrammatic views showing profile sections of the airplane along section lines 8, 9, 10, 11 and 12, respectively, of Fig. 5.

One embodiment of a tailless airplane in accordance with my invention is shown in Figs. 1–3a, and reference is first directed to said figures. The wing 15 has a generally triangular planform, and all wing sections of each tapered wing half have basic wing profiles of substantially zero center-of-pressure movement throughout all normal flight angles of incidence. This is illustratively accomplished by use of symmetrical wing profiles (see Fig. 3a), giving a substantially constant center-of-pressure position one-quarter of the chord length back from the leading edge. The wing profiles at all stations from root to tip are substantially similar; there being, however, a taper ratio in thickness which exceeds the taper ratio in planform, so that while the root section 16 of the wing is a substantial percentage of the chord, as for instance up to 25%, at the tips 17 the thickness ratio has been reduced to about 12% of the chord. In other words, technically expressed, there is taper in planform and in thickness.

The halves of the wing are set with a marked sweep-back angle which, measured along the quarter chord lines 18, may be as high as approximately 30°, being in this instance 27°.

Figure 3:
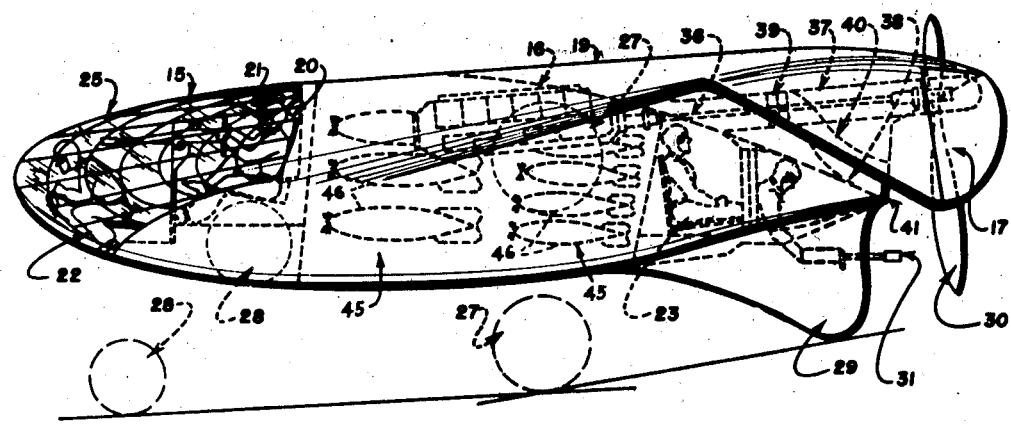
Fig. 3 is a side elevation of the airplane illustrated in the other two figures, also shown in flight attitude.
Figure 3A:
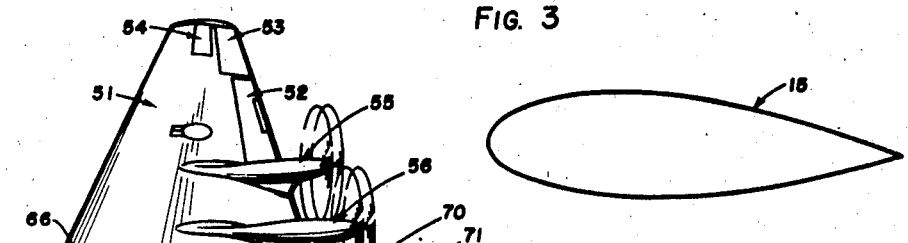
Fig. 3a is a diagram of a typical wing profile.
Figure 4:
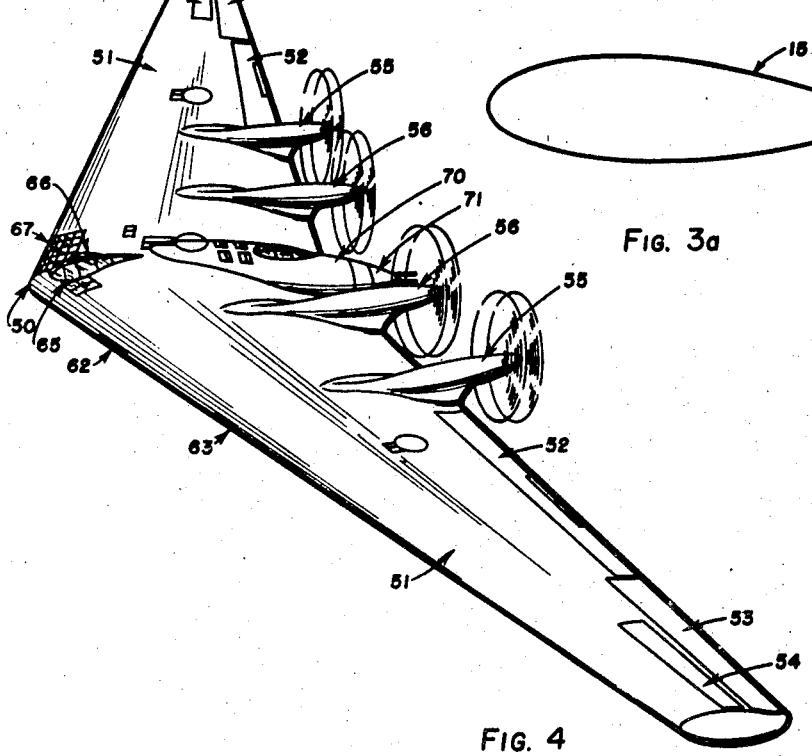
Fig. 4 is a perspective view of another embodiment of an airplane in accordance with the invention.
Figure 7:
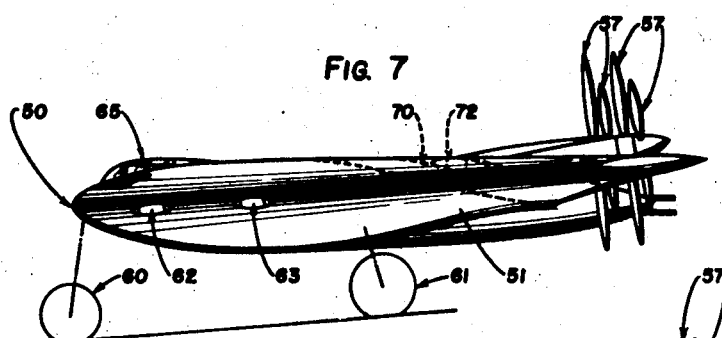
Fig. 7 is a side elevational view of the airplane in Fig. 4.
Figure 8:
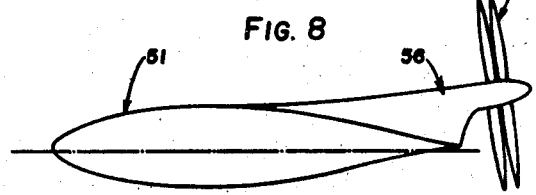
Figure 9:
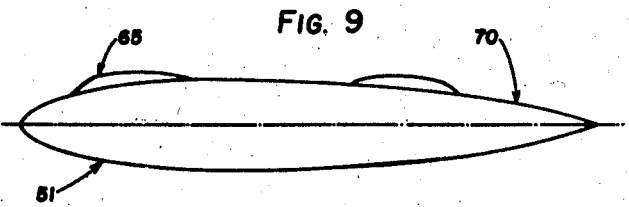
Figure 10:
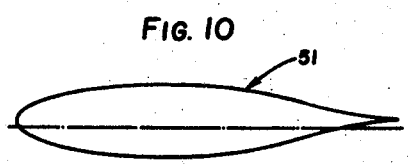
Figure 11:
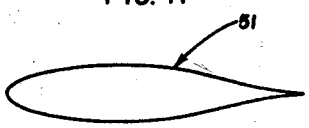
Figure 12:
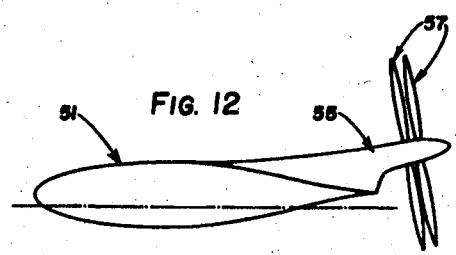

In the illustrative embodiment of Figs. 1–3, the inner or main portion of the wing, comprising the major portion of lifting surface, is formed with its two halves 19—19 set at a moderately large positive vertical dihedral angle, in the neighborhood of 8°. The two tips 17, however, are sharply deflected downward, their negative dihedral angle being shown at about 30° to horizontal, or 38° to the main portions 19 of the wing.

The two halves of the wing are also "washed out" from root to tip, that is, the wing structure is given a forward twist so that the chords of the wing sections progressively decrease in angle of attack from root to tip; if the chord line or median line of the root section be taken as zero, the wing tips are set at a negative angle preferably of about 4°, and falling usually within a range of between substantially 2° and 6°. Stated in a different manner, this means that if the plane is at such an angle of attack that its central section has zero lift, the tip sections will have a negative or downwardly directed lift corresponding with the 4° angle of attack. In flying aspect, however, the median line of the root section may have approximately a 4° or greater angle of attack, and the tip sections as a whole will have an effective positive aerodynamic angle of attack, so that the average or effective lift thereon is positive or upward and outward.

The taper in planform is, in the case of the embodiment of Figs. 1–3, quite high, the taper ratio between root chord and tip chord being 6:1, although this ratio may desirably be less in some cases, as for instance in the case of the second embodiment of the invention later to be described. The high taper ratio gives the wing tips a low Reynolds number, but because of the washout angle and consequently lower angle of attack the tendency to tip stall is minimized. Their downward deflection contributes to this freedom by further decreasing slightly their effective angle of attack.

It is accordingly possible, even with a moderate span, to achieve a reasonably high aspect ratio, substantially 5:1 or over, and here 5.7:1, with a resultingly low induced drag and high aerodynamic efficiency. Since this structure gives a very large root chord, and as the permissible thickness of an airfoil is expressed as a percentage of the chord, the heavily tapered wing and the deep root section permit the use of a sufficiently thick central portion of the wing to make it habitable. Thus the present design is developed on the basis of a span of eighty-five feet and a root section chord of twenty-four feet. With a 25% root section thickness this means that the central section of the wing has a thickness of six feet, and while this is not sufficient to give the head room demanded for comfort in a long range passenger transport plane, it is ample for a bomber. Many transport planes of the shorter range type have, in fact, no more head room than that here contemplated, while if the span be increased to ninety-five feet and the proportions be kept the same, the thickness at the center becomes about six feet eight inches, permitting standing room for the man of average or more than average height over a fair proportion of the habitable space within the wing.

The roominess of the habitable portion of the wing is shown in Figs. 1 and 3, where the figures of the pilot, co-pilot, two machine gunners, and bomber are drawn to scale as men of average size, i. e., about five feet ten inches. The seating locations for these members of the crew are indicated in Fig. 2 by the dotted rectangles 20 and 20' for pilot and co-pilot, 21 for the machine gunners, and 22 for the bombardier. Even where the wing tapers rapidly toward the trailing edge, there is room for an additional machine gunner 23, shown in two positions in Fig. 3.

In spite of the theoretical dictum that an airplane of substantially triangular planform requires that its longitudinal stability be derived from inherently stable sections, tests with both wind tunnel and flying models have shown that the flying wing described has ample stability around all major axes, and has a suitable positive moment coefficient at the angle of attack for zero lift. Longitudinal stability is provided by the combination of sweepback and washout and by suitable location of the center of gravity fore and aft, and stability in roll is given by the effective positive dihedral angle, for it should be pointed out that in spite of the negative dihedral angle of the wing tips the effective or composite dihedral angle of the wing as a whole is slightly positive. As a first approximation this effective dihedral angle may be considered as the angle of a plane joining the root chord and the tip chord; its actual value may be obtained by a summation of the effects of the positively inclined central portion and the negatively inclined tips and will actually be somewhat larger than the approximate value, owing to the larger area affected by the positive dihedral angle than that affected by the negative one.

The function of the downwardly deflected tips in contributing to stability in yaw requires a more extended discussion. It may be seen that the principal contribution to the lift of the wing with downwardly deflected tips is provided by the main central sections 19 of high positive dihedral, and this lift is applied at a point somewhat forward of the geometric center of this main portion of the wing and perpendicular to the plane thereof. For each half 19 of the central section, this force may be considered as being resolved into two components, a vertical component which is proportional to the cosine of the dihedral angle of this portion of the span and an inwardly directed horizontal component which is proportional to the sine of the dihedral angle, both components being understood to pass through the center of pressure of the main or inner section of the wing half. The two inwardly directed horizontal components acting on the main sections of the two halves of the wing create moments about the yaw axis whose lever arms are the distances between the yaw axis and the lines of action of said components.

Because of the sweepback, as the plane yaws to the left, for instance, the lever arms of the horizontal inward force on the left wing half is increased, and that of the horizontal inward force on the right wing half is decreased, so that there is an increased yawing couple to the left. In other words, the inward horizontal components on the two wing halves are unstabilizing.

The opposite effect, however, but to a larger degree, is obtained by the downwardly deflected wing tip sections 17, so that the overall directional stability about the yaw axis will be positive. Although the wing halves have been described as provided with a certain degree of washout in order to secure longitudinal stability, this washout is not carried to the point where negative or neutral lift is obtained at the tip sections (except perhaps at very high speeds, as in a dive). Assuming, therefore, positive lift at the tips, the resulting lifting force on each tip section 17 may be resolved into vertically upward and horizontal outwardly directed components acting through the center of pressure of the tip section. It may here be noted that to say that a lifting force acts upwardly and outwardly on the tip sections is equivalent to saying that said sections have a positive aerodynamic angle of attack in flight attitude. Since the negative dihedral angle of the tip is approximately 35° (effectively apparently somewhat more) the outwardly directed component, being proportional to the sine of the dihedral angle, is equal to something over one-half of the total lift on the tip.

Further, owing to the sweepback of the wings, the centers of pressure of the wing tip sections 17 are located substantially aft of the centers of pressure of the main wing portions of positive dihedral, and the lever arms at which the outwardly directed components act about the yaw axis are therefore substantially greater than the lever arms at which the inwardly directed components act about the yaw axis.

Considering now the forces of lift contributed by the two portions of the wing, we have a large force on the central section acting through a relatively short lever arm and applied at a relatively small dihedral angle so that the resultant inwardly directed moment is small, and we have a much smaller force with a much longer lever arm and with a much larger dihedral angle of opposite sign, so that if the plane be deflected directionally, the moment of the outwardly directed force is the prevailing one.

The effect of these outwardly directed forces is to produce a couple having a very powerful stabilizing effect about the yaw axis. This effect may be illustrated by considering a rectangular block which carries in each end a screw eye to which is fastened a rubber band. When these bands are stretched in opposite directions away from the block, the immediate effect is to swing the block into the line of the two opposing forces. If, however, the two bands are stretched across the block, so that the forces are directed inwardly, their equilibrium is unstable, and their tendency is to increase any disalignment which may exist.

An important feature of this stabilizing action is that it is immediately effective upon the slightest deviation in yaw, the restoring couple being approximately proportional to the sine of the angle of yaw. This is a sharp contrast to the stabilizing effect of a wing fin, for the lift of the fin section is proportional to the angle of attack, i. e. to the yaw, while its effective lever arm is also proportional to the sine of the same angle. It follows that the correcting moment is proportional to the square of the angle of yaw, and for small angles the correcting moment becomes negligible.

An additional stabilizing effect of the deflected tips is due to their action as fins upon the sweptback wings. When the plane is deflected about its yaw axis there is, upon each wing tip, a drag whose lever arm, owing to the angle of sweepback, is increased upon the leading side of the wing and decreased upon the trailing side, thus tending to straighten the course of the plane. This latter effect, which might be termed the fin effect, is equally effective if the wing tip be turned up, and flying models have actually been constructed and flown in this condition. Measured statically, in wind tunnel test, the directional stability of model planes with these upwardly deflected tips has been found to be excellent, but when actually flown these models have shown a marked tendency to oscillate around the yaw axis, exhibiting the tendency to weave or "fishtail" which has previously been referred to in connection with conventional planes but in a very exaggerated degree.

This oscillatory tendency is markedly absent when the downwardly deflected tips are used, the plane being not only stable but nearly deadbeat about the yaw axis. Furthermore, owing possibly to an excessive roll stability out of proper proportion to the available yaw stability, the models with upwardly deflected tips show a marked spiral instability, while the models with downwardly deflected tips have proved impossible to spin, even when launched in spin postures.

A feature of major importance is the use of wing sections of substantially zero center-of-pressure movement, accomplished in the illustrative embodiment by use of basic wing profiles which are substantially symmetrical. It may here be stated that the expression "basic wing profiles" as used herein and in the claims refers to the wing sections with any control surface included in that wing section in undeflected or neutral position. Also, it should be understood that when I refer herein or in the claims to all sections of each wing half having basic wing profiles of substantially zero center-of-pressure movement, or as being substantially symmetrical, I do not exclude the possibility of minor discontinuities or breaks at such places as fins, gun turret blisters, nacelles, or other minor prominences that might be added.

As is well understood, a wing section of substantially zero center-of-pressure movement has zero pitching moment at the angle of attack for zero lift. An adequate positive or stalling moment coefficient at zero lift, which is necessary if the airplane is to be capable of being trimmed for cruising in the high speed range with elevators neutral, is obtained with the described combination of sweepback and aerodynamic washout.

As previously pointed out, it has heretofore been believed that a tailless airplane with wing panels substantially or highly tapered in planform (triangular planform), must derive its longitudinal stability (or more properly speaking, its positive moment coefficient at zero lift) either largely or entirely from inherently stable airfoil sections. The present invention has overcome the indicated difficulties by the employment of basic wing sections of substantially zero center-of-pressure movement. The washed out and swept back wing as a whole, using the wing section of substantially zero center-of-pressure movement throughout, has been demonstrated to have the necessary positive moment coefficient at zero lift, and moreover, this is accomplished with but a small washout angle, so that drag is minimized, and lift to drag ratio augmented.

Visibility is provided by forming a portion of the central section of the leading edge of the wing of transparent plastic 25. A smaller portion 26 of the skin of the wing toward the trailing edge may also be formed of plastic to give visibility for the member of the crew positioned at this point.

The wing is shown in the figures in flying attitude, with the two rear wheels 27 of the tricycle landing gear retracted into the wing in the position shown, widely spaced and well aft. The forward wheel 28 retracts beneath the pilot and co-pilot positions. The positions of these wheels when extended are shown in Figs. 2 and 3 by the dotted lines 27' and 28'. Since the mechanism for extending and retracting the landing gear may be made identical in type with that used in conventional types of planes, no attempt is made to show it in detail. The only nonretractable portion of the landing gear is the tail skid 29, projecting downwardly from the central portion of the trailing edge of the plane. The function of this skid or fin is to prevent damage to the propellers 30 in case an attempt is made to land or take off at too high an angle of attack. Its stabilizing effect in yaw is inconsiderable. In the present instance, it also serves the secondary purpose of housing a machine gun 31. Owing to the dihedral of the wing, the intersection of this fin with wing appears in Fig. 3 as a concave line. This should not, however, be misinterpreted as a departure of the wing profile from symmetry.

The power plant, of whatever type may be employed, is housed within the wing, and while there is not limitation on the type of power plant to be used, I have here indicated the use of two motors or engines driving pusher propellers 30. As here shown, each of the pusher propellers 30 is driven by a motor 35, which is embedded in the wing and connects with the propeller through a drive shaft 36 extending through a shaft housing or tunnel 37 carried by a fin 38 which projects somewhat above the upper surface of the trailing edge of the wing. These fins also are so small as to have a negligible aerodynamic effect insofar as stability in yaw is concerned. Like the fin 29 their function is mechanical rather than aerodynamic, and when the landing gear is retracted, the fins 29 and 38 are the only portions of the entire structure (except, perhaps armament) which contribute to parasitic drag, all of the rest of the drag of the plane being that which is necessarily associated with the creation of the lift.

Avoidance of such parasitic drag is, of course, one important reason for carrying the engines within the wing, and those shown are of the double opposed liquid-cooled type designed for this purpose. It is to be noted, however, that there is ample room within the wing for mounting the radial type of motor. Whatever the type of power plant actually used, there remains the question of supplying the necessary air flow for satisfactory cooling, and the solution adopted for this problem I consider to be an important feature in the solution of the broader question of providing an all-wing plane having the necessary characteristics to meet commercial and military demands.

It has been customary in airplane design to utilize the airflow past the plane for the purpose of cooling, either by exposing the cylinders of the air-cooled motor directly to the slip-stream of the propellers, or by mounting a cowling over the air-cooled motor and inducing a circulation therethrough, or by mounting a radiator upon some part of the leading portion of the wing or fuselage. All of these solutions require that power be applied, and all contribute to parasitic drag on the plane, and it can be shown that the effect of this drag is such that the power used in cooling the motor is relatively inefficiently applied.

In accordance with this invention a blower 39 is mounted on the shaft of each of the motors 35 in a duct 40 in the fin 38, this duct leading downwardly from the blower to discharge via a vent 41 at the trailing edge of the wing. The intake for each blower is a slot or slots 42 extending spanwise in the upper surface of the wing in the rearward half of the upper surface and leading to the intake ends of the ducts 40. The radiating surface 43 of each motor is mounted in the path of the airflow taken in through the slots 42 and flowing to the blower.

The intake slots of the cooling duct are located at approximately the point where the boundary layer starts to build up at the beginning of a stall, and by the removal of this boundary layer the lift of the wing is improved and the stall is delayed, and substantially increased angles of attack become possible. The discharge at the trailing edge of the wing is parallel with and has no material effect upon the airflow, especially as the size of the discharge aperture is so computed that the discharge takes place substantially at the air speed of the plane.

As a first result of this arrangement, the power used in cooling the motors is very effectively applied and results in an improvement rather than a decrease in aerodynamic efficiency. The intake ports for the duct can be so located as to give their effect in increasing the angle of stall to any portion of the wing which may be desired. If the main body of the wing is constructed in the cellular manner which is common present day practice, the ducts between the intake ports and the radiators may be constructed of such large cross-section that the friction loss within them is negligible, so that the portion of the wing which stalls first may be controlled to a considerable degree and as a result the designer is given more freedom. For example, a design which is otherwise satisfactory but which shows evidence of dangerous tip stall at high angles of attack may, by the use of this expedient to delay the stall at the tip portions of the wing, be made into a completely satisfactory design. The device has the advantage that it does not decrease the efficiency of the wing at low angles of attack, as does the slotted wing which, although it increases the maximum lift, also increases drag and actually reduces lift at moderate angles of attack. The present arrangement does not increase drag and any change in lift produced by it is favorable.

The principal advantage of the arrangement, however, is that it permits increased angles of attack, therefore increased lift in landing, and hence a decreased landing speed, thus furnishing a solution to a heretofore unsolved problem in tailless airplanes. And it does this without introduction of pitching moments, as do most known high lift devices, and is therefore of specific applicability to tailless airplanes, particularly of the type herein disclosed, in which it is important to avoid introduction of extraneous pitching moments.

Another advantage of this arrangement is that it is not subject to being rendered inoperative by icing, as are the self-opening slots heretofore considered to be one of the best of the high lift devices.

This method of mounting and cooling the motors also leads to a solution of the ever present problem of centering, i. e. longitudinal balance. With ordinary methods of cooling, the position of the motor is more or less predetermined for the designer before he starts. If air-cooled motors are used, the slip-stream is relied on for supplying the cooling air, and the motor must be mounted either ahead or back of the wing, and either of these positions is quite largely displaced from the center of gravity. The motors are heavy and if their lever arm about the center of gravity is long they exert a large pitching moment which must be balanced by corresponding moments of opposite sign if the plane is to fly satisfactorily. Furthermore, this moment is constant and those which balance it must therefore also be largely constant, so that live or payload cannot be relied upon for this purpose to more than a very limited extent. In accordance with my invention the motors may be placed in practically any desired position along the chord of the wing, and instead of requiring counterbalancing may themselves be used as counterbalances, so that the center of gravity of the plane may be located in the position which allows of the largest possible latitude in the distribution of the payload. This results not only in a possible increase in the maximum angle of attack, but also in a small radius of gyration about the transverse axis of the plane, which in turn permits the use of smaller controlling moments, smaller control sections on the wing, and greater aerodynamic efficiency.

A similar reduction in the radius of gyration, with its accompanying advantages, also is possible about the longitudinal axis, resulting in a decrease in the necessary control moments to be applied about the axis of roll. The two motors are spaced laterally only so far as is necessary to give the desired clearance between the propeller tips. Pusher type propellers are used, so that the wing acts in undisturbed air, and the trailing edge of the wing immediately ahead of the propellers is made straight, instead of sweptback, so that the disturbance of the air within which the propellers themselves act is a minimum.

The small lateral lever arm also decreases the unbalance of thrust in the case of the failure of one motor, and so reduces the amount of yawing moment which must be provided by the control surfaces in order that the plane may be controlled in this condition; and finally, there is ample latitude in positioning the motors vertically so that the propeller thrust may be applied through the horizontal plane of the center of gravity or as near thereto as may be desired, thus reducing the counterbalancing control moments or trimming moments that need be applied about the transverse axis for control in pitch to counteract variations in power.

In other words, this method of mounting and cooling the motors goes far toward eliminating the adverse effect on all-wing designs which has been inherent in the rigid limitations in centering. In a conventional plane the latitude as to the lever arm of the center of gravity with respect to the aerodynamic center of the wing may be 10% or 15% of the chord, whereas in an all-wing plane that latitude may be only 3% or 4% of the chord. In a modern transport plane, however, the mean aerodynamic chord of the wing is only from 15% to 20% of the overall length of the plane, whereas the mean chord is over 50% of the overall length of the design shown. In the conventional transport plane, the space available for cargo and passengers is four to four and one-half times as long as the mean chord, whereas in my plane this space is only about one and one-half times as long as the mean chord, the space available laterally being correspondingly greater. It follows that in terms of overall length, the latitude of centering is from 2⅓% to 3% in the conventional plane and from 1½% to 2% in my plane, while the change in lever arm possible by the movement of a passenger from one end of the plane to the other is only one and one-half times the mean chord of my plane, whereas it is four and one-half times the mean chord in the transport plane used for comparison. It follows that the effective centering ability of the plane here described is not materially inferior to that of the conventional plane, although the maximum allowable angle of attack, and consequently the maximum lift coefficient, is somewhat less than that of the conventional airplane.

In actual fact, however, any inferiority in centering ability which may be charged against the plane here described is unimportant because of the possibility of concentrating the payload within the centering area. In no type of plane is the centering requirement more rigorous than in a bomber, where a major portion of the payload must be released in flight and practically instantaneously, making it necessary to retrim the ship to meet the changed condition quickly and usually under extremely adverse conditions. In the present case, the bomb racks 45, carrying bombs 46, may be located entirely within the centering area, so that the change in centering produced by dropping the load is well within the allowable limits.

Control of the plane in flight is achieved entirely through movable sections at the trailing edge of the wing. The two small sections 47 nearest the center of the plane have the smallest moment and controlling effect and are used as trimming stabilizers to offset any otherwise unbalanced pitching or rolling moments arising from the loading of the plane. The next portions, reading outwardly from the center, are the sections 48 which are used as elevators, and are governed by a control gear of any conventional type and raised or depressed by longitudinal motion of the steering column or stick (not shown). If desired, the sections 53 may also be moved differentially by rotating the wheel or moving the stick laterally, but in a bomber this would not ordinarily be necessary or desirable, as there would be no necessity for stunting the plane, and the aileron action required by differential control of these sections may ordinarily be replaced by the action of the tip sections 49.

The tip sections act both as ailerons and rudders. Their lever arm is large, and the turning and rolling moments produced by their actuation are correspondingly large. Furthermore, the vertical component of the force produced by deflecting these movable surfaces is in the proper direction to produce a roll which is favorable to the yawing moment of the horizontal force produced by the same deflection. The same surfaces therefore combine the functions of rudders and ailerons, to produce the proper ratios of bank and turn to prevent any sideslip. I therefore prefer to actuate the movable surfaces 49 by means of the wheel and omit the usual rudder bar or pedal altogether, although the usual rudder control may, of course, be provided if desired. The preferred method, however, gives a true two control plane, with turn and bank automatically coordinated, greatly increasing the ease of handling the ship.

The advantages gained by the construction described are not easily expressed numerically because of the difficulty in establishing a norm. Perhaps the fairest comparison is one with a conventional type of plane carrying the same payload at the same speed. Under these circumstances, the drag is approximately one-half that of the standard or conventional plane, so that only one-half of the power is required. The motor weight can be correspondingly reduced. Furthermore, since the entire body of the plane contributes to the lift, and since all of the difficulties inherent in the problem of attaching the wings to a fuselage are avoided, the weight of the plane itself is reduced as is the cost and complexity of structure and the likelihood of failure of any structural part. If equal wing loadings could be used, these two decreases in dead weight could be taken advantage of to achieve a still greater reduction in span and a further and cumulative lightening of the plane, but since the wing loading must still be less than that of the conventional plane in order to achieve a corresponding landing speed this additional reduction in weight cannot yet be realized. The design does not, however, lead to the excessive wing areas and corresponding loss of advantage that has been predicted under former theories, so that the final result is a plane which, for the same top speed, landing speed, and load, can be built at a saving of 25% or more in weight and approximately an equal saving in both initial and operating costs.

In Figs. 4 to 12, I have shown a second illustrative embodiment within the broad framework of the invention, and illustrating in this instance a larger type of airplane of a somewhat relatively thinner wing, lesser taper in planform and without the downwardly deflected wing tips.

The airplane in this instance again has a substantially triangular planform with an angular nose 50 and tapered and swept back wing panels 51, all basic wing profiles of which are designed to have substantially zero center-of-pressure movement throughout all normal flight angles of incidence. This is again illustratively, though, of course, not necessarily, accomplished by use of substantially symmetrical wing profiles from root to tip (see Figs. 7 through 12), giving a substantially constant center-of-pressure position one quarter of the chord length back from the leading edge. The sweepback measured along the 25% chord line 51a is less than in the first described embodiment, and may be carried as low as approximately 20°, though it is here substantially 22°. The dihedral angle, also measured along the 25% chord line, is 2° or less, while the wing panels are provided with an aerodynamic washout of preferably not over substantially 4°. This embodiment thus has a low dihedral angle, low washout angle and a moderate sweepback angle. The taper ratio in planform is less than in the first described embodiment, the ratio of root chord to tip chord being about 4:1 (not less than about 3:1), and the aspect ratio may become as high as substantially 10:1. The wing panels are tapered in both planform and thickness, the thickness of the root chord section (in percentage of the chord), taken at the plane of symmetry of the wing where the two wing panels join (Fig. 7) being in the approximate range of from 16% to 25%, and in this instance 19%, and the tip chord section (Fig. 8) for a root chord section of 19% thickness being of substantially 15% thickness. The taper ratio in thickness thus exceeds the taper ratio in planform.

A specific design of the instant airplane (Figs. 4-12) has a wing area of 4,000 square feet, a span of 172 feet, and a root chord of approximately 450 inches, which with a 19% thickness root section, provides approximately an 85 inch head room for the crew housed inside the wing. The taper ratio of root chord to tip chord in this airplane is 4:1, and the aspect ratio is 7.4 to 1.

Each wing panel is here shown to be provided along its trailing edge with an elevator or "elevon" 52 and a pitch-control flap 53, and on its surface near the tip with a rudder 54. Each wing panel also carries propeller shaft fairings, an outboard fairing 55 and an inboard fairing 56, behind which are geared dual rotation pusher propellers 57, the engines for driving said propellers being understood to be located wholly within the wing panels.

A retractable nose wheel is indicated at 60, and dual main wheels at 61, said wheels being understood to be retractable into the wing section, and forming when extended a tricycle landing gear. The leading edge of the wing is shown to be provided with inboard and outboard motor cooling air inlets 62 and 63, respectively.

As heretofore stated, the crew for a large airplane of the present design is accommodated substantially entirely within the wing, though for small designs a crew nacelle may be incorporated at the root section. In the present embodiment, a pilot enclosure or canopy 65 and a co-pilot enclosure or canopy 66 are provided at the root or center section, one on each side of the root chord, and a transparent section 67 is shown as fitted into the nose on one side, all as will be clearly evident from the drawings. The central section is also shown as formed toward the rear with a rudimentary nacelle 70, merged into the wing and extending somewhat rearwardly of the trailing edge thereof to terminate in a cannon turret 71. This nacelle is shown as provided with a somewhat raised observation canopy or window 72.

The control surfaces may be of various kinds, those here given as suitable, not forming a part of the present invention. However, some description of the operation of the indicated controls will be given. Directional control is secured by the retractable rudders 54, which are differentially raised and lowered above and below the aft 50% of the outer wing surface in order to produce drag and/or side force in the proper direction to cause a yawing moment. Elevons 52 are so-called because they combine the functions of elevator and aileron. When moved in opposite directions, they operate in the manner of any ordinary trailing edge aileron, and when moved together in the same direction, they operate as elevators. Linkages to accomplish such control are well known in the art and need not be discussed herein. Landing flaps, not illustrated, of any conventional character, may be utilized on the under surface of the wing and such flaps may be placed along the entire span inboard of the elevons. Such flaps when extended for landing will, of course, exert a diving moment, which can be amply compensated by raising pitch control surfaces 53. The pitch control surfaces 53 are used with the landing flaps only for landing and take-off. They produce a stalling moment without seriously affecting the lift. This stalling moment permits the use of landing flaps of the usual type to obtain high lift coefficients.

The airplane of Figs. 4-12, in the absence of downwardly deflected wing tips, end plates, or other such expedients, derives its directional stability from the sweepback of the wings and from the pusher propellers, and while this stability is not great, it has been found adequate. This airplane, although in somewhat modified proportions as compared with the first described embodiment, achieves the same excellent performances as does the first described embodiment, and because of the lesser taper ratio in planform, is not subject to tip stall even though not employing the downwardly deflected wing tips. The spanwise air intake wing slots for boundary layer removal and motor cooling as shown in the embodiment of Figs. 1-3 may of course be utilized in the embodiment of Figs. 9-12, with similar advantageous results.

A comparison of the performance of the airplane of Figs. 4-12 with airplanes of conventional design may be made by comparing ratios of maximum lift coefficient to minimum drag coefficient, and $C_L(max)/C_D(min)$. The minimum drag co-efficient for the present airplane, as obtained from N. A. C. A. wind tunnel tests on a scale model, is .0087. The maximum lift coefficient for the scale model of the present airplane, obtained with elevons up 10°, pitch flaps up 50° and landing flaps down 60°, is found to be 1.51. Correcting for scale effect, an estimated value of 1.72 is obtained. The ratio of $C_L(max)$ to $C_D(min)$ then becomes 1.72/.0087, or a value of 198.

To my knowledge, there is no present day airplane of the bomber type having a minimum drag coefficient of less than .024, or a maximum lift coefficient (power off) exceeding about 2.5. The ratio of the two is 104, and a comparison of this figure with the factor of 198 for the present airplane clearly demonstrates its advantage in performance.

I claim:

1. A tailless airplane comprising a generally triangular planform wing of relatively thick central airfoil section, the halves of said wing having lines of center of pressure which are swept back from root to tip and said halves having substantial taper in thickness and in planform, all sections of each half having basic wing profiles of substantially zero center-of-pressure movement throughout all normal flight angles of incidence, and the chords of said sections progressively decreasing in angle of attack from root to tip.

2. An airplane in accordance with claim 1, in which the wing halves have a taper ratio in thickness which exceeds their taper ratio in planform.

3. A tailless airplane comprising a generally triangular planform wing of relatively thick central airfoil section, the halves of said wing having lines of center of pressure which are swept back from root to tip and said halves having substantial taper in thickness and in planform, all sections of each half having substantially symmetrical basic wing profiles and the chords of said sections progressively decreasing in angle of attack from root to tip.

4. An airplane in accordance with claim 3, in which the wing halves have a taper ratio in thickness which exceeds their taper ratio in planform.

5. A tailless airplane in accordance with claim 1, having a taper ratio of root chord to tip chord of the approximate order of from 3:1 to 6:1, an aspect ratio of the approximate order of from 5:1 to 10:1, a sweepback angle measured along the 25% chord line of the approximate order of from 20° to 30°, an aerodynamic washout angle of not exceeding substantially 4°, and a central section thickness of the approximate order of from 16% to 25% of the root chord.

6. A tailless plane in accordance with claim 1, having a span of the order of 85 feet, a ratio of span to the mean chord of the order of 5.7:1 and a central section thickness of the order of 25% of the root chord, to provide a habitable tailless plane having a central section thickness of the order of 6 feet.

7. A tailless plane in accordance with claim 1, having a ratio of span to the mean chord of the order of 5.7:1, and a central section thickness of the order of 25% of the root chord, to provide a habitable plane of the tailless type.

8. A tailless plane in accordance with claim 1, having a central section thickness of the order of 6 feet or more, a ratio of root chord to central section thickness of the order of 4:1, and a ratio of span to mean chord of the order of 5.7:1, to provide a habitable tailless plane of relatively short wing span.

9. A tailless plane in accordance with claim 1, including a thick central section wherein an operating crew may be housed, and motive power means completely within said central section in proximity to the center of gravity of said plane, to provide a habitable plane of the tailless type with completely enclosed motive power means at minimum moment arm distance from the center of gravity of said plane.

10. A tailless plane in accordance with claim 1, including a thick central section wherein an operating crew may be housed, and a pair of motors symmetrically disposed entirely within said central section in proximity to the center of gravity of said plane, to provide a habitable plane of the tailless type with completely enclosed motors at minimum moment arm distance from the center of gravity of said plane.

11. A tailless airplane in accordance with claim 1, having air intake slots in the rearward halves of the upper surfaces of the wing panels in a position to remove the boundary layer built up thereon at the beginning of a stall.

12. A tailless airplane comprising a generally triangular planform wing having a high taper ratio and a thick central airfoil section for crew accommodation, a power plane for said airplane within said wing, the halves of said wing having swept back lines of center of pressure and comprising substantially symmetrical sections whose chords decrease in angle of attack from root to tip sections and which halves are disposed at a positive dihedral angle, the tips of said wing being downwardly deflected and disposed at a negative dihedral angle of approximately −30° to the horizontal, elevator control surfaces for said airplane disposed on the trailing edge of said wing, and combined rudder and aileron surfaces on said tips.

13. An airplane in accordance with claim 12 wherein the taper ratio between root chord and tip chord of the wing is in excess of 5:1.

14. An airplane in accordance with claim 12 having aspect and taper ratios both in excess of 5:1, a sweepback of between 25° and 30°, and an angle of attack at the tip sections of the wing between 2° and 6° less than that at the root sections.

15. An airplane in accordance with claim 12 wherein said motors operate pusher propellers located at the central section of said wing and laterally spaced no more than is necessary to prevent aerodynamic interference between the propeller tips, and the trailing edge of the wing in front of said propellers is perpendicular to the longitudinal axis of the airplane.

16. An airplane in accordance with claim 12 wherein said motors operate pusher propellers located at the central section of said wing and laterally spaced no more than is necessary to prevent aerodynamic interference between the propeller tips, said motors being mounted with respect to longitudinal position within said wing to act as counterweights to the payload to be carried by said airplane to bring said payload entirely within the centering area of the airplane.

17. An airplane wing comprising central portions and tip portions whose respective dihedral angles are opposite in sign and in which the composite dihedral angle is greater than zero, said wing being so proportioned and arranged that the product of the horizontal component of the lift and its lever arm measured from the line of action of said component to the yaw axis of the airplane for the tip portion of the wing is greater than for the corresponding central portion of the wing.

18. An airplane comprising a sweptback wing having a central portion provided with a positive dihedral angle and tip portions having a negative dihedral angle, a control surface associated with the trailing edge of each of said wing tips for differentially modifying the aerodynamic forces acting on said tip portions only to provide simultaneous roll and yaw control for said airplane.

19. An airplane comprising a sweptback wing having tip portions disposed at a material negative dihedral angle and at a positive aerodynamic angle of attack in flight attitude, the sweepback of said wing being sufficient to locate the centers of pressure of the wing tip portions substantially aft of the center of gravity of the airplane, the reaction of the airstream on said wing tip portions when said wing is in flight attitude stabilizing the airplane in yaw by developing horizontal outwardly directed components of force on said wing tip portions owing to said positive aerodynamic angle of attack.

20. An airplane comprising a sweptback wing having tip portions disposed at a material negative dihedral angle and at a positive aerodynamic angle of attack in flight attitude, the sweepback of said wing being sufficient to locate the centers of pressure of the wing tip portions a substantial distance aft of the center of gravity of the airplane, and oppositely movable combination rudder and aileron control surfaces hinged along the trailing edges of said wing tip portions by which the airplane may be turned and banked, the reaction of the airstream on said wing tip portions when said wing is in flight attitude stabilizing the airplane in yaw by developing horizontal outwardly directed components of force on said wing tip portions owing to said positive aerodynamic angle of attack, and the location of said wing tip portions a substantial distance aft of the center of gravity of the airplane causing said control surfaces on said tip portions to develop an effective yawing couple when deflected, while the negative dihedral angle of the wing tip portions along which said control surfaces are hinged cause the direction of bank of the airplane to be correct for the direction of yaw.

JOHN K. NORTHROP.